United States Patent [19]

Hertler

[11] 4,026,916
[45] May 31, 1977

[54] TERMINAL AMINE-CONTAINING POLYPIVALOLACTONE

[75] Inventor: Walter Raymond Hertler, Kennett Square, Pa.

[73] Assignee: E. I. Du Pont de Nemours & Company, Wilmington, Del.

[22] Filed: Mar. 15, 1976

[21] Appl. No.: 667,280

[52] U.S. Cl. .................... 260/471 R; 260/78 A; 260/78.3 R; 260/878 R; 260/482 R
[51] Int. Cl.² .................................. C08G 63/02
[58] Field of Search ........ 260/78 A, 484 A, 78.3 R, 260/471 R, 482 R

[56] References Cited

UNITED STATES PATENTS

| | | | |
|---|---|---|---|
| 3,169,945 | 2/1965 | Hostettler | 260/78.3 |
| 3,268,487 | 8/1966 | Klootwijk | 260/78.3 |
| 3,424,835 | 1/1969 | Armour et al. | 264/210 |
| 3,462,398 | 8/1969 | Wagner et al. | 260/78.3 |
| 3,658,768 | 4/1972 | Harvey et al. | 260/78.3 R |
| 3,684,771 | 8/1972 | Braun | 260/77 |

FOREIGN PATENTS OR APPLICATIONS 1,231,163   4/1960   France

Primary Examiner—Harold D. Anderson
Assistant Examiner—E. A. Nielsen

[57] ABSTRACT

Terminal amine-containing polypivalolactones of the formula

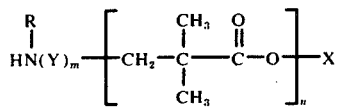

in which
R is H or lower alkyl,
Y is

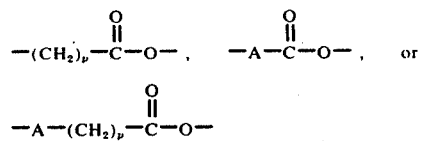

where
$p$ is 1 to 5, and
A is an aromatic hydrocarbon,
$n$ is 2 to about 1000,
$m$ is 0 or 1, and
X is H, alkali metal or R'$_4$N where R' is lower alkyl are useful for preparing block copolymers and graft copolymers. These terminal amine-containing polypivalolactones are prepared by polymerizing pivalolactone in the presence of a nitrogen-containing initiator such as a tetraalkylammonium p-aminophenylacetate.

6 Claims, No Drawings

TERMINAL AMINE-CONTAINING POLYPIVALOLACTONE

BACKGROUND OF THE INVENTION

1. Field of the Invention

This invention relates to terminal amine-containing polypivalolactones and to their preparation.

2. Description of the Prior Art

It is known to convert certain β-lactones to polyesters by ring-opening processes. French patent No. 1,231,163 shows polymerization of α-methyl-α-ethyl-β-propiolactone and higher homologues by the action of tertiary amines. The polymers are stated to be very high in molecular weight.

Jaacks et al., Die Makromoleculare Chemie, 131, 295–303 (1970) show that treatment of propiolactone or pivalolactone with trimethylamine produces polymers with macrozwitterion structures of the formula

In U.S. Pat. No. 3,897,513 Sundet teaches the preparation of random graft copolymers by reacting a base polymer containing random initiating sites such as free carboxyl groups with a β-lactone such as pivalolactone.

It is also known that graft copolymers and block copolymers can be prepared by condensing a terminal amine-containing polymer such as a nylon polymer chain with a polymer containing free carboxyl groups. It is difficult however to control crosslinking of these copolymers since some of the nylon polymer chains may contain a second terminal amine group which can become a site for crosslinking. Accordingly, it is difficult to maintain the thermoplastic character of these copolymers.

SUMMARY OF THE INVENTION

In accordance with this invention terminal amine-containing polypivalolactones of low to medium molecular weight are provided which contain no potential crosslinking sites. These polymers are of the formula

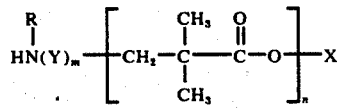

in which
R is H or lower alkyl,
Y is

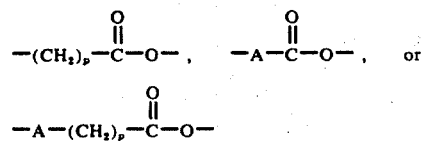

where
p is 1 to 5, and
A is phenylene, (lower alkyl) phenylene, di (lower alkyl) phenylene, naphthylene or biphenylene,
n is 2 to 1000,
m is 0 or 1, and
X is H, alkali metal or R′$_4$N where R′ is lower alkyl.
By "lower alkyl" is meant alkyl of 1 to about 5 carbon atoms.

These terminal amine-containing polypivalolactone polymers are prepared by polymerizing pivalolactone in the presence of a nitrogen-containing initiator of the formula

in which R, Y, X and m are as defined above provided that when m is 0, X is H, and when m is 1, X is alkali or R′$_4$N, at a temperature of about −10° C to about 120° C. The provisions on the value of X in the initiator do not carry forth to the value of X in the amine-terminated polypivalolactone because these polymers once formed, can be converted to any other X value by well-known metathesis reactions.

DESCRIPTION OF THE PREFERRED EMBODIMENTS

The products of this invention are solid thermoplastic polymers which are useful building blocks for forming block or graft copolymers. These polymers are also useful per se as molding materials.

The products of this invention are prepared by polymerizing pivalolactone in the presence of a nitrogen-containing initiator as defined above. Suitable initiators include ammonia, and primary and secondary amines such as tetramethylammonium glycinate, methylamine, tetrabutylammonium p-aminobenzoate, tetraethylammonium 4-methylaminobenzoate, lithium 6-aminocaproate, tetrabutylammonium 4-amino-3,5-dimethylbenzoate, tetramethylammonium p′-amino-p-phenylbenzoate, and sodium 3-aminonaphthalene-2-carboxylate. The preferred initiators are tetra(lower alkyl)-ammonium aminoaryl)lower alkan)oate and especially tetrabutylammonium p-aminophenylacetate.

The polymerization may be carried out neat or it may be conducted in an organic liquid reaction medium. If a reaction medium is employed, it is preferably one which is a solvent for pivalolactone and the amine, but a non-solvent for the polymer. Operable reaction media include ethers such as tetrahydrofuran, dioxane and diethyl ether; nitriles such as acetonitrile and benzonitrile; hydrocarbons such as heptane, benzene, and toluene, and esters such as ethyl acetate, butyl acetate, methyl propionate and the like. Additional solvents, particularly for the initiators, include alcohols such as methanol, ethanol, butanol and the like.

The polymerization may be carried out at temperatures in the range from about −10° to about 120° C. The preferred temperatures are from about 25° to about 60° C.

Pressure is not a critical variable in the polymerization. Pressures both above and below atmospheric pressure may be used and atmospheric pressure is preferred for convenience.

Time of polymerization may vary from about 5 seconds to about 24 hours and more depending on the temperature and the activity of the initiator. The polymerization is exothermic.

The molar ratio of initiator to pivalolactone in the polymerization mixture may vary from about 1:2 to about 1:1000. Preferably the mole ratio is about 1:10 to about 1:50. The mole ratio will determine the molecular weight of the product.

The products of this invention are particularly useful for the preparation of block and graft copolymers. These copolymers are prepared by condensing the terminal amine-containing polypivalolactone polymer of this invention with a base polymer containing one or more amine-reactive sites such as an anhydride group, a vicinal pair of carboxylic groups or a carboxylic acid group adjacent to an alkoxycarbonyl group. Being able to control the molecular weight of the terminal amine-containing polymer to the low-to-medium molecular weight range is important for this utility since higher molecular weight polymers form block and graft copolymers with difficulty and have undesirable properties.

The condensation of the terminal amine-containing polymers of this invention with a base polymer containing an amine-reactive site is carried out by heating them together with mixing in the molten state at a temperature of about 75° to about 250° C, or in solution at a temperature of about 75° to about 100° C or higher. The reaction time can vary from about 15 seconds to about 1 hour in the melt and from about 15 seconds to about 5 hours in solution. Reaction in the melt is conveniently carried out on a roll mill, in a melt extruder, or in an internal mixer having convoluted rollers, sigma blades, etc.

The following examples illustrate the products of this invention, their preparation, and their use. All parts are by weight and all temperatures are in degrees Centigrade.

EXAMPLE 1

This example illustrates the preparation of terminal amine-containing polypivalolactone of the formula:

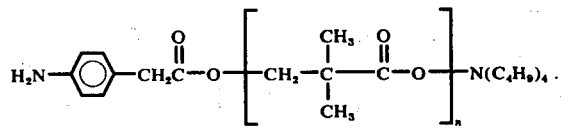

A. Preparation of Tetrabutylammonium p-aminophenylacetate p-Aminophenylacetic acid (3.02 g) was dissolved in 51.9 g of 10% aqueous tetrabutylammonium hydroxide, and the solution was evaporated under reduced pressure to an amber oil. Upon further drying at 0.1 mm pressure at room temperature, a green solid was obtained. After rinsing with tetrahydrofuran there was obtained 4.696 g of nearly colorless crystals of tetrabutylammonium p-aminophenylacetate.

B. Preparation of Terminal Amine-Containing Polypivalolactone

To a stirred solution of 50 g (0.5 mole) of pivalolactone in 100 ml of anhydrous tetrahydrofuran in a 500-ml resin kettle was added a solution of 4.7 g (0.012 mole) of tetrabutylammonium p-aminophenylacetate in 10 ml of methanol. After 5 minutes an exothermic polymerization occurred, and the reaction mixture refluxed as polymer precipitated. The polymer was collected by filtration, washed twice with ethanol in a blender and dried at 70° at 0.1 mm pressure to give 51.7 of terminal amine-containing polypivalolactone.

Anal. Calcd for $C_{234}H_{380}O_{86}N_2$ (d.p.=42): C, 61.0; H, 8.35; N, 0.61. Found: C, 60.88; H, 8.28; N, 0.42; C, 61.30; H, 8.26; N, 0.41.

$\eta_{inh}$=0.15 (0.5% in trifluoroacetic acid at 25°)

$T_m$=207° (determined by differential scanning calorimetry on reheating).

C. Molding with Terminal Amine-Containing Polypivalolactone

A sample of the terminal amine-containing polypivalolactone prepared in part (B) above was molded into a thin disc at 180° and 3000 psi. The disc was ejected from the mold at 100°.

D. Grafting with Terminal Amine-Containing Polypivalolactone

Using a 76.2 mm, two-roll, roller mill preheated to 225°, 24 g of the terminal amine-containing polypivalolactone prepared in Part (B) was first melted (amber color) and then rolled for 13 minutes with 41 g of an ethylene/methyl acrylate/half ethyl ester of maleic acid 41.5/54/4.5 terpolymer. Initially, vapors were observed, but they soon ceased. Sixty grams of amber, rubbery graft copolymer were obtained.

A film of the graft copolymer was pressed between Kapton polyimide film (Du Pont Co.) at 215°/14.06 kg/cm². The film, when stretched at 5.80 cm/min, gave 360 percent elongation at the break (175 percent permanent set) with a tensile strength of 133.6 kg/cm². A sample which was stretched (after cold drawing) three times to 160 percent had 15 percent permanent set. A fiber, spun at 204° had a denier of 209, an elongation of 200% and a tenacity of 0.38 grams per denier.

A sample of the graft copolymer was purified by grinding in a mill with dry ice and then blending for 1 hour with 300 ml of ethanol containing 300 ml of tetrahydrofuran, and 40 ml of 10% hydrochloric acid. After washing in the blender with ethanol, the polymer was dried at 60°/0.1 mm. Purified polymer was pressed into a clear, yellow, bubble-free film at 200°/1054.5 kg/cm² which had 400 percent elongation (100 percent elastic elongation) and a tensile strength of 197.75 kg/cm².

EXAMPLE 2

To a stirred solution of 30 g (0.3 mole) of purified pivalolactone in 150 ml of tetrahydrofuran at room temperature was added a solution of 1.96 g (5 mmol) of recrystallized tetrabutylammonium p-aminophenylacetate in methanol. The temperature rose to 40 ° and polymer separated. After stirring for 18 hours, the polymer was collected by filtration, washed twice with ethanol, and dried at 70°/0.1 mm to give 29.8 g of terminal amine-containing polypivalolactone.

Anal. Calcd for $C_{349}H_{564}O_{132}N_2$ (d.p.=65): C, 60.0; H, 8.24; N, 0.41. Found: C, 60.27; H, 7.82; N, 0.43; C, 59.98; H, 7.67; N, 0.40.

$\eta_{inh}$=0.34 (0.5% in trifluoroacetic acid at 25°) corresponding to a degree of polymerization of 65.

$T_m$=212° (determined by differential scanning calorimetry on reheating).

EXAMPLE 3

To a stirred solution of 40 g (0.4 mole) of purified pivalolactone in 300 ml of tetrahydrofuran was added a solution of 6.6 g (0.017 mole) of tetrabutylammonium p-aminophenylacetate in 20 ml of methanol. After 18 hours, the precipitated polymer was collected by filtration, washed with ethanol, and dried to give 40.2 g of terminal amine-containing polypivalolactone.

Anal. Calcd for $C_{124}H_{204}N_2O_{42}$: C, 62.18; H, 8.59; N, 1.17. Found: C, 60.76; H, 8.38; N, 0.62. C, 60.75; H, 8.40; N, 0.67.

$\eta_{inh}$=0.12 (0.5% in trifluoroacetic acid at 25°) corresponding to a degree of polymerization of 18.

$T_m$=202° (determined by differential scanning calorimetry on reheating) corresponding to a degree of polymerization of 24.

EXAMPLE 4

To a stirred solution of 100 g (1 mole) of purified pivalolactone in 600 ml of tetrahydrofuran was added a solution of 6.05 g (0.04 mole) of p-aminophenylacetic acid in 40 ml of 1 M methanolic tetrabutylammonium hydroxide. An ice bath was used to keep the temperature from rising above 55°. After stirring overnight the precipitated polymer was collected by filtration, washed with methanol, and dried. It was then blended with ethanol, filtered, and dried to give 99.4 g of terminal amine-containing polypivalolactone.

Anal. Calcd for $C_{114}H_{188}N_2O_{38}$ (d.p.=18): C, 62.5; H, 8.65; N, 128. Calcd for $C_{144}H_{236}N_2O_{50}$ (d.p.=24): C, 61.85; H, 8.51; N, 1.00. Found: C, 61.61; H, 8.28; N, 0.90.

$\eta_{inh}$=0.12 (0.5% in trifluoroacetic acid at 25°) corresponding to a degree of polymerization of 18.

$T_m$=201° (determined by differential scanning calorimetry) corresponding to a degree of polymerization of 24.

EXAMPLE 5

To a stirred solution of 50 g (0.5 mole) of purified pivalolactone in 350 ml of anhydrous tetrahydrofuran was added a solution of 4.91 g (0.0125 mole) of tetrabutylammonium p-aminophenylacetate in 20 ml of anhydrous acetonitrile. Exothermic polymerization began promptly and was controlled with an ice bath. After stirring overnight at room temperature, the product was collected by filtration, washed with tetrahydrofuran and methanol, and dried at 60°/0.1 mm to give 53.4 g of terminal amine-containing polypivalolactone.

$T_m$=206° (determined by differential scanning calorimetry on reheating) corresponding to a degree of polymerization of 32.

$\eta_{inh}$=0.19 (0.5% in trifluoroacetic acid at 25°) corresponding to a degree of polymerization of 32.

Anal. Calcd for $C_{184}H_{300}O_{66}N_2$ (d.p.=32): C, 61.45; H, 8.41; N, 0.78. Found: C, 59.50; H, 8.06; N, 0.58.

EXAMPLE 6

This example demonstrates the preparation of terminal amine-containing polypivalolactone of the formula:

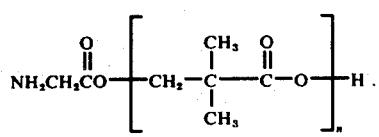

A mixture of 938.4 mg of glycine, 1.251 g of potassium bicarbonate, and 3.304 g of 18-crown-6 [J. Am. Chem. Soc. 89, 7017-7036 (1967)] and 500 ml of methanol was stirred at reflux until solution was complete. The solution was evaporated on a rotary evaporator, and the residue was dissolved in a minimum of methanol, treated with excess anhydrous acetonitrile and distilled until nearly all of the methanol was removed in the methanol-acetonitrile azeotrope. The resulting warm solution was added to a stirred solution of 25 g of pivalolactone in 150 ml of tetrahydrofuran at 5°. Within one minute, polymer began to precipitate, and the mixture was warmed to 40°. The temperature gradually rose to 52° without external heating. After standing for 18 hours, the mixture was treated with an excess of ethanol containing 5 ml of concentrated hydrochloric acid, and centrifuged. The polymer was washed three times with ethanol and dried at 90°/0.1 mm to give 15.7 g of terminal amine-containing polypivalolactone as the hydrochloride.

Anal. Calcd. for degree of polymerization of 20; $(C_{102}H_{166}O_{42}NCl)_x$: C, 57.75; H, 7.91; N, 0.66; Cl, 1.68. Found: C, 58.01; H, 7.66; N, 0.68; Cl, 1.76. C, 58.18; H, 7.68; N, 0.74; Cl, 1.60.

Tm was determined by differential scanning calorimetry (reheat) to be 188° which corresponds to a degree of polymerization of 20.

The polymer was treated in a blender with a 20:1 mixture of ethanol and concentrated ammonium hydroxide, then twice with ethanol, once with 5% acetic acid in ethanol, and finally twice again with ethanol. After drying at 100°/0.1 mm, there was obtained 12 g of terminal amine-containing polypivalolactone.

Anal. Calcd. for degree of polymerization of 20; $(C_{102}H_{165}O_{42}N)_x$: C, 58.97; H, 8.01; N, 0.67. Found: C, 59.09; H, 7.55; N, 0.58.

EXAMPLE 7

The following example illustrates the formation of polypivalolactone using tetrabutylammonium p-aminobenzoate as initiator.

A suspension of 6.86 g (0.05 mole) of p-aminobenzoic acid in 25 ml of methanol was treated with 50 ml of 1M tetrabutylammonium hydroxide in methanol, and the resulting solution was evaporated in vacuo to colorless crystals of tetrabutylammonium p-aminobenzoate.

To a stirred solution of 25 g (0.25 mole) of purified pivalolactone in 175 ml of anhydrous tetrahydrofuran was added in one portion a solution of 4.64 g (0.0123 mole) of tetrabutylammonium p-aminobenzoate in 20 ml of acetonitrile. The temperature immediately began to rise, and after a short time polymer began to precipitate. The temperature reached 60° and slowly decreased. Stirring was continued for 3 hours and then 100 ml of methanol was added. The mixture was filtered, and the filter cake was washed with methanol and dried at 90°/0.1 mm to give 22.6 g of terminal amine-containing polypivalolactone.

Anal. Calcd. for $C_{123}H_{202}N_2O_{42}$ (d.p. = 20): C, 62.05; H, 8.55; N, 1.18. Found: C, 60.69; H, 7.95; N, 1.46. C, 60.65; H, 7.99; N, 130.

$T_M$ = 191° (determined by differential scanning calorimetry on reheating) corresponding to a degree of polymerization of 18.

$\eta_{inh}$ = 0.016(0.5% in trifluoroacetic acid at 25°).

The embodiments of the invention in which an exclusive property or privilege is claimed are defined as follows:

1. A terminal amine-containing polypivalolactone of the formula

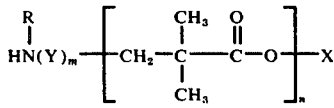

in which

R is H or lower alkyl,
Y is $$-(CH_2)_p-\overset{O}{\underset{\|}{C}}-O-, \quad -A-\overset{O}{\underset{\|}{C}}-O-, \quad \text{or}$$

$$-A-(CH_2)_p-\overset{O}{\underset{\|}{C}}-O-$$

where
  p is 1 to 5, and
  A is phenylene, (lower alkyl)phenylene, di(lower alkyl)phenylene, naphthylene or biphenylene,
  n is 2 to 1000, m is 0 or 1, and
  X is H, alkali metal or $R'_4N$ where R' is lower alkyl.

2. The terminal amine-containing polypivalolactone of claim 1 in which
R is H
Y is $$A-(CH_2)_p-\overset{O}{\underset{\|}{C}}-O-$$

and
X is $R'_4N-$.

3. The terminal amine-containing polypivalolactone of claim 2 in which
Y is

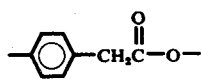

and

, R' is butyl.

4. The method of preparing a terminal amine-containing polypivalolactone of claim 1 which comprises polymerizing pivalolactone in the presence of nitrogen-containing initiator of the formula $$HN(Y)_mX \quad \text{with R on N}$$

in which
R is H or lower alkyl,
Y is $$-(CH_2)_p-\overset{O}{\underset{\|}{C}}-O-, \quad -A-\overset{O}{\underset{\|}{C}}-O-, \quad \text{or}$$

$$A-(CH_2)_p-\overset{O}{\underset{\|}{C}}-O-$$

where
  p is 1 to 5, and
  A is phenylene, (lower alkyl)phenylene, di(lower alkyl)phenylene, naphthylene or biphenylene,
  m is 0 or 1, and
  X is H, alkali metal or $R'_4N$ where R' is lower alkyl,
  provided that
    when m is 0, X is H, and
    when m is 1, X is alkali metal or $R'_4N$.
at a temperature of $-10°$ to $120°$ C.

5. The method of claim 4 in which the initiator is a tetra(lower alkyl) ammonium aminoaryl (lower alkan)oate.

6. The method of claim 5 in which the initiator is tetrabutylammonium p-aminophenylacetate.

* * * * *